United States Patent [19]
Sorber

[11] Patent Number: 6,088,777
[45] Date of Patent: Jul. 11, 2000

[54] MEMORY SYSTEM AND METHOD FOR DYNAMICALLY ALLOCATING A MEMORY DIVIDED INTO PLURAL CLASSES WITH DIFFERENT BLOCK SIZES TO STORE VARIABLE LENGTH MESSAGES

[75] Inventor: Gordon P. Sorber, Kil, Sweden

[73] Assignee: Ericsson Messaging Systems, Inc., Woodbury, N.Y.

[21] Appl. No.: 08/968,514

[22] Filed: Nov. 12, 1997

[51] Int. Cl.[7] .................................................. G06F 12/00
[52] U.S. Cl. .......................... 711/171; 711/173; 711/153; 370/381
[58] Field of Search .................................... 711/173, 171, 711/170, 172, 153, 129; 707/205; 370/381, 382

[56] References Cited

U.S. PATENT DOCUMENTS

| | | | |
|---|---|---|---|
| 4,503,501 | 3/1985 | Coulson et al. | 711/171 |
| 4,774,706 | 9/1988 | Adams | 370/465 |
| 4,780,815 | 10/1988 | Shiota | 711/171 |
| 4,916,693 | 4/1990 | Shimada et al. | 370/538 |
| 5,289,470 | 2/1994 | Chang et al. | 711/173 |
| 5,339,411 | 8/1994 | Heaton, Jr. | 711/171 |
| 5,367,643 | 11/1994 | Chang et al. | 710/129 |
| 5,426,424 | 6/1995 | Vanden Heuvel et al. | 340/825.44 |
| 5,517,632 | 5/1996 | Matsumoto et al. | 711/171 |
| 5,561,786 | 10/1996 | Morse | 711/170 |
| 5,570,362 | 10/1996 | Nishimura | 370/395 |
| 5,588,138 | 12/1996 | Bai et al. | 711/173 |
| 5,742,793 | 4/1998 | Sturges | 711/152 |
| 5,784,698 | 7/1998 | Brady et al. | 711/171 |
| 5,802,598 | 9/1998 | Watt | 711/170 |

*Primary Examiner*—Glenn Gossage
*Attorney, Agent, or Firm*—Nixon & Vanderhye P.C.

[57] ABSTRACT

A memory system and management method for optimized dynamic memory allocation are disclosed. A memory manager requests a large area of memory from an operating system, and from the viewpoint of the operating system, that memory is fixed. That fixed memory area is then divided up into an integral number of classes, e.g. by the memory manager. Each memory class includes same-size blocks of memory linked together by pointers. The memory block sizes are different for each class, and the sizes of the different class memory blocks are selected to conform to the CPU and memory access bus hardware (e.g. align with a bus bit width) as well as to accommodate the various sizes of data expected to be processed for a particular application. The memory manager maintains a separate, linked list of unused blocks for each class. Each memory block is zeroed initially and after release by a process previously assigned to it. When a block of memory is assigned to a particular process, a flag is set to indicate that it is in use. Incoming messages of variable length are parsed based upon definitions of message structures expected to be received by a particular application. The parsed message or message segment is then stored in an appropriate size memory block.

44 Claims, 12 Drawing Sheets

*Fig. 3*
| CLASS NUMBER | SIZE OCTETS |
|---|---|
| 0 | SPARE |
| 1 | 4 |
| 2 | 8 |
| 3 | 16 |
| 4 | 32 |
| 5 | 64 |
| 6 | 128 |
| 7 | 256 |
| 8 | 512 |
| 9-15 | SPARE |
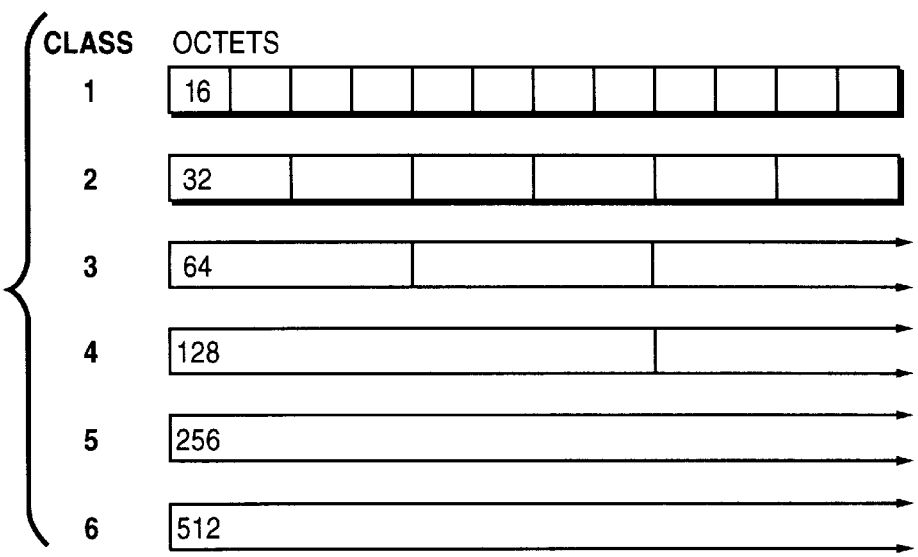
*Fig. 4*
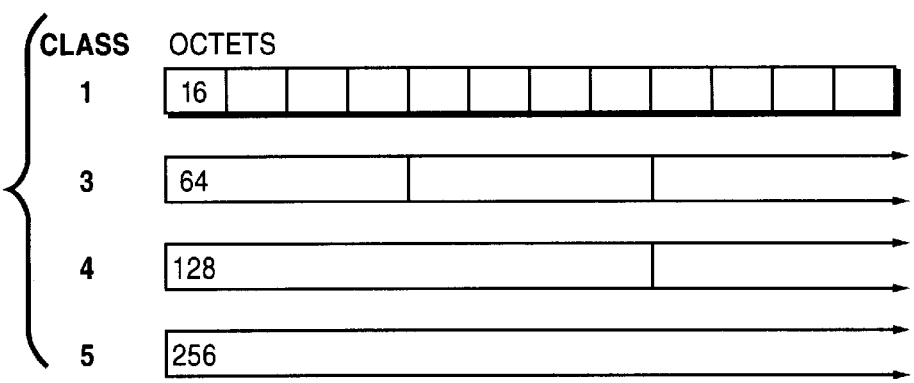
*Fig. 5*

FREE CLASS INDEX ARRAY

| CLASS | FIRST IN CLASS | FIRST AVAILABLE BLOCK |
|---|---|---|
| 1 | POINTER A1 | POINTER A2 |
| 2 | POINTER B1 | POINTER B2 |
| 3 | POINTER C1 | POINTER C2 |
| 4 | POINTER D1 | POINTER D2 |

Fig. 12B

PARSER INSTRUCTIONS

| CLASS | TYPE | SIZE | ACTION | TABLE |
|---|---|---|---|---|
| 1 | HSN | 8 | Validate, write to block | Next |
| 0 | SDL | 8 | Validate, write to block | Next |
| 0 | Length n | 6 | Validate, save | Next |
| 0 | SIO | 8 | Validate, save, write to block | Next |
| 1 | DPC | 14 | Write to block | Next |
| 0 | OPC | 14 | Write to block | Next |
| 0 | CIC | 12 | Write to block | Next |
| 1 | H1H2 | 8 | Write to block | Next |
| 0 | CPC | 6 | Write to block | Next |
| 0 | MI + N | 16 | Write to block | Next |
| N/8 | Digits | 8* N | Write to block | Done |

MEMORY SYSTEM AND METHOD FOR DYNAMICALLY ALLOCATING A MEMORY DIVIDED INTO PLURAL CLASSES WITH DIFFERENT BLOCK SIZES TO STORE VARIABLE LENGTH MESSAGES

FIELD OF THE INVENTION

The present invention relates to the allocation and management of memory. While the invention therefore finds application to any data processing environment, one advantageous application of the invention is to the storage and processing of messages communicated between computers.

BACKGROUND OF THE INVENTION

Many data processing applications require the storage in memory of variable length data. For example, communications messages between computers are often sent in accordance with multiple layer communications protocols. For example, the Open Systems Interconnection (OSI) model divides a communications process into seven layers in a protocol "stack." Certain communication tasks are assigned to certain ones of the layers, and the output of each layer conforms to a precise format. Data from an application or process running on a first host computer passes down through each OSI layer in the protocol stack on its way to the communications network. As the information descends through each layer, it undergoes a transformation that prepares it for processing by the next layer. Upon reaching the bottom layer, data is transferred over the physical medium of a communications network as an electrical signal to a receiving computer which then processes the message in reverse order up the protocol stack through the seven OSI layers.

Accordingly, the layer protocols and interfaces therebetween specify communication between a process or program executed on one host computer's operating system and another process or program running on another computer's operating system. One such protocol is the Signaling System Number 7 (SS7) developed to meet the advanced signaling requirements of digital networks.

FIG. 1 shows an SS7 protocol stack for two host computers A and B. The SS7 model in FIG. 1 shows functional levels, sometimes referred to as TTC/ITU-T levels, alongside the traditional OSI, seven-layer protocol model. In general, OSI layers 1–3 comprise functions for the transportation of information from one location to another. The message transfer part (MTP) and the signaling connection control part (SCCP) are examples of SS7 modules which perform the OSI layer services 1–3.

OSI layers 4–7 define functions related to end-to-end communication. These layers are independent of the internal structure of the communications network. Transaction capabilities (TC) and/or user parts (UP) provide OSI layer 4–7 services. If OSI layer 7 represents the semantics of a communication, then OSI layers 1–6 are the means by which that communication is realized. End user application entities provide application layer protocols in the OSI layer number 7.

Since signaling system number 7 is used to transmit information between different "users," for example telephony users or integrated service digital network (ISDN) users, its functions are divided into a number of "user parts" (UP) as shown in FIG. 1. TCAP stands for transaction capabilities part, ISUP for ISDN user part, and TUP for telephony user part, among many others. Each of these user parts process signal information before and after transmission to the signaling network.

The message transfer part (MTP) reliably transports and delivers user part information across the signaling system number 7 network. The MTP also reacts to system and network failures that affect the information from the user parts and takes the necessary action to ensure that the information is safely conveyed. As shown in FIG. 1, the MTP is divided into three functional levels L1, L2, and L3. The MTP-L1 defines the physical, electrical, and functional characteristics of a signaling data link and the means to access it. The signaling link is sometimes referred to as a "bearer" and is a bidirectional transmission path for signaling messages between two signaling points. The MTP-L2 defines the functions and procedures for and relating to the transfer of signaling messages over one individual signaling link, including various ancillary functions, such as error detection, framing, bit-stuffing, etc. The MTP-L3 handles signaling network functions including message routing, discrimination, and distribution as well as signaling network management functions.

A signaling message is transferred over the signaling link in the form of signaling units. In the basis SS7 model, there are three types of signaling units differentiated by means of a length indicator. Message signal units (MSUs) carry information generated by a user part. The MSUs are passed from SS7 module to module, down through the MTP layers to the link and to the next node, where they follow the same path up to the MTP layers and are finally delivered to the opposite user part. If an error is detected in an MSU at the receiving MTP-L2, reception is not acknowledged, and the MSU is retransmitted. Link status signal units (LSSU) and fill in signal units (FISU) are used by MTP-L2 to exchange control information. The LSSU is used for starting up a signaling link and for handling errors in the link. The FISU is used to keep the link running when there are no MSUs to be sent. All three of these signals will contain parameters used to acknowledge (ACK) or reject (NACK) MSU signals at the transmitting MTP-L2 when a received MSU is found to be correct or in error, respectively, when examined at the receiving node's MTP-L2.

Each host computer connected to the network includes data processing hardware and software for generating and formatting messages down the protocol stack for transmission on a link and up a protocol stack for delivery to an end application. For example, the local signaling controller hardware may include a SUN (SUN is believed to be a registered trademark of Sun Microsystems, Inc.) workstation that employs multiple processors connected via appropriate buses to random access memory (RAM), read-only memory (ROM), and magnetic storage media. The RAM main memory is used for storing temporary variables, messages, or other intermediate information including execution of instructions by the processors. ROM and/or other static storage devices store static information and instructions for the processors. The magnetic storage media may also store information instructions as well as various files.

Certain areas of the memory are occupied by processes, buffers, data streams, peripheral device driver software, and an operating system, e.g., the UNIX operating system (OS). The stored information may be generally divided into executable code and into data (e.g., data packets) both of which occupy separate and well defined areas of the memory. Since many of the code and data are dynamic in the sense that their size is very often changing, a major task of the operating system is to ensure that no entity attempts to use memory being used by another entity. In essence, this is the operating system's memory management function.

Because the operating system must serve an enormous range of different memory functions, the operating system's memory service functions must be very flexible and generic. Unfortunately, it is these very qualities which makes the operating system memory management slow and inefficient.

As part of the generic memory management function, the operating system takes blocks of memory from its memory pool and assigns each memory block to a different task typically using some proprietary strategy. Until that task is terminated in some way, the assigned memory block may not be used by any other task. Thus, the operating system may assign a memory area for itself, another for interrupt processes, a third for input/output buffers, and another for an operating system user such as an SS7 process. Still other memory areas may be dynamically allocated at the request of the operating system or the operating system user's processes.

Dynamic allocation of memory is performed by operating system functions which process memory requests that includes memory size specifications and return memory address pointers that provide the address of a first byte or octet of the assigned memory area. When the assigned memory is no longer needed, it is returned to the memory pool.

As already mentioned, this dynamic allocation and return of memory is quite cumbersome and slow. Consider the example situation in an SS7 signaling stack where the length of a message varies as it moves up and down the stack. For a message moving down the stack, the new data to be added to the message is typically a header appended to the beginning of the message. The new header is stored in a new memory area, and thereafter, the old message is copied into the memory after that new header. After the copying is completed, the old memory area is returned to the operating system. When the next process, here the next level in the stack, wants to add a new header, the same procedure is performed: the new header is stored in a new memory area, the message is copied into that new memory area after the newly stored header, a new memory area pointer is provided to the next process, and the old memory area pointer pointing to the old memory location where the message was just previously stored is returned to the operating system. A similar process is performed going up the protocol stack.

Because the messages have variable length with the new messages usually longer going down the stack and shorter going up the stack, copying operations are performed at least once at each process. Consequently, there is quite a bit of copying in any protocol stack. The ISUP, for example, contains over twenty processes.

As a result of storing and copying these different length messages, various memory areas dynamically allocated by the operating system end up being separated by small "free" memory areas, none of which can be used because it is too small. This result is referred to as "memory fragmentation."

One manner of dealing with memory fragmentation is for the operating system to "pack" the used memory sections together in one area of the memory. But to do this, the operating system must maintain a look-up table of pointers which match old pointers with new pointers so that when a process asks for a particular piece of data using the old pointer, that processor receives the correct data using the corresponding new pointer. This "packing" of data in memory is referred to as "garbage collection" and is a sufficiently burdensome task that the operating system must often stop serving its application processes while it repacks the memory. In real time type applications such as telecommunications, this total lack of access while the data is being rearranged and substantial delays caused when data is being accessed due to the pointer translation are very often unacceptable.

Another memory management problem is the lack of memory. One way in which the operating system may try to solve the problem of insufficient memory is to move data associated with a first task away to a disk or other memory to free up that area for use by a second task. When the first task needs its data, the data is "swapped." Such swapping adds delays to data access operations in addition to the more basic problem of not being able to access the data when it is needed.

Yet another memory allocation and management problem relates to the architecture of the central processing unit(s) and the memory access bus. For example, memory may need to be addressed in blocks of two, four, or eight octets due to the bit width of the CPU or the bit width of the access bus. Otherwise there is a bit "misalignment" of the accessed data structure from memory and the hardware that processes the accessed data.

For efficiency, it is important that the blocks of data accessed from memory be bit-aligned with the CPU and access bus hardware. In other words, each block of access memory should begin with an address which is an integral multiple of the bit width of the CPU and access bus. This is because the CPU fetches data from memory from memory addresses which are integral multiples of that bus bit width. If the bus is 32 bits wide (four octets) and a four octet message is stored in memory at the beginning of a second octet, two bus cycles (rather than one) are needed to access that message. In addition, that "misaligned" message accessed in two bus cycles must be rebuilt by the CPU which may take six or more CPU cycles. On the other hand, if this four octet message is aligned to begin at an integral multiple of the bus width of 32 bits, e.g., 32, 64, 96, etc., only one bus cycle and one CPU cycle are necessary to access the message.

Different approaches have been proposed for handling variable length messages. For example, U.S. Pat. No. 5,367,643 to Chang et al. discloses a generic high bandwidth adapter that includes a data packet memory used to temporarily store variable length data packets. The packet memory is segmented into a plurality of buffers, and each data packet is stored in one or more buffers as required by the length of that packet. A generic adaptive manager organizes data packets in the buffers and into queues for further processing or data transfer. In particular, the packet memory is segmented into a set of 256-byte buffers. Packets are stored in one or more of these buffers and deleted or routed as appropriate. However, Chang's buffers all have a uniform size. U.S. Pat. No. 5,426,424 to Vanden Heuvel et al. discloses a memory manager that allocates and deallocates memory blocks. Rather than allocating a minimum block of memory much larger than an actual received message, Vanden Heuvel allocates memory blocks in either contiguous or non-contiguous fashion. Like Chang, Vanden Heuvel's data blocks are of all the same size.

What is needed is a new memory allocation and management approach that overcomes the drawbacks described above and provides faster and more efficient memory allocation and management.

It is therefore an object of the present invention to overcome the above-described problems.

It is an object of the present invention to off-load certain memory access and management functions from the operating system and perform those functions more efficiently.

It is a further object of the present invention to provide a memory structure and store data in that memory structure so that various delays and inefficiencies caused by memory fragmentation/garbage collection, lack of memory, data swapping and misalignment with data processing hardware are avoided.

These and other objects are met by the present invention which provides for optimized memory management to efficiently and dynamically allocate memory. A memory manager (separate from the operating system) requests a large area of memory from the operating system. From the viewpoint of the operating system, that large area of memory is a fixed memory area neither moved nor altered. The memory manager divides that fixed memory area into an integral number of classes or groups. Each memory class includes same-size blocks of memory linked together by pointers. The memory block sizes are different for each class, and the sizes are selected to conform to and align with CPU(s) and memory access bus architecture as well as to accommodate the various sizes of data expected to be processed for a particular application. For example, in the SS7 application described above, there are smaller messages or message segments such as alarms and message headers and longer messages or message segments such as MSUs.

Each memory block in a class or group has the same number of octets. The memory manager maintains a separate linked list of unused blocks within each class/group to ensure each memory block is zeroed initially and zeroed after release by a process previously assigned to it. When a block of memory is loaned to a particular process, one or more bits are set to indicate that it is in use. Ultimately, the memory manager monitors how many blocks are in each class, how many of these blocks are loaned out, and how many are available. Such monitoring is useful not only in memory allocation but also in debugging errors.

Incoming messages are analyzed and parsed based upon definitions of message structures to be received in a particular application. Messages and segments of messages are stored in the appropriate size memory blocks from memory block classes best configured for the size of the message/message segment. For example, a message header may be stored in one class memory block and the message data stored into another class memory block linked to the first block. The more closely that the memory blocks class sizes match the length of messages being processed, the more efficiently memory is allocated and accessed.

Once the memory blocks are defined in each class, those blocks never move. Moreover, data is written into memory only once for each message. Instead of moving a memory block, a memory pointer to that fixed block is passed to another requesting process. By giving pointers to other processes, the stored information is effectively passed to the other processes through the pointers. Because each of the memory blocks is and remains aligned with the CPU and bus structure from its initial creation, the data stored and accessed from each memory block is aligned.

BRIEF DESCRIPTION OF THE DRAWINGS

FIG. 3 is a diagram illustrating the size of memory blocks in each memory class in an example embodiment of the present invention;

FIG. 4 illustrates the sizes of each memory block numerically defined in FIG. 3;

FIG. 5 illustrates the sizes of memory blocks from example classes of memory blocks in accordance with another example embodiment of the present invention;

FIG. 12B is a table of example parser instructions;

DETAILED DESCRIPTION OF THE INVENTION

In the following description, for purposes of explanation and not limitation, specific details are set forth such as specific signaling systems, hardware configurations, data structures, data flows, interfaces, techniques, etc. in order to provide a thorough understanding of the present invention. However, it will be apparent to one skilled in the art that the present invention may be practiced in other embodiments that depart from these specific details. For example, while the detailed example embodiment is disclosed in the context of Signaling System Number 7, the present invention may be used in many other communication and computer applications. For example, the present invention may be advantageously applied in TCP/IP (Transmission Control Protocol/Internet Protocol)-Internet applications, asynchronous transfer mode (ATM) signaling, mobile, ISDN, other digital telephony and satellite communications, and in any data processing application where efficient dynamic memory allocation and management are desirable. In other instances, detailed descriptions of well-known methods, protocols, and data processing devices are omitted so as not to obscure the description of the present invention with unnecessary detail.

Figure 1:
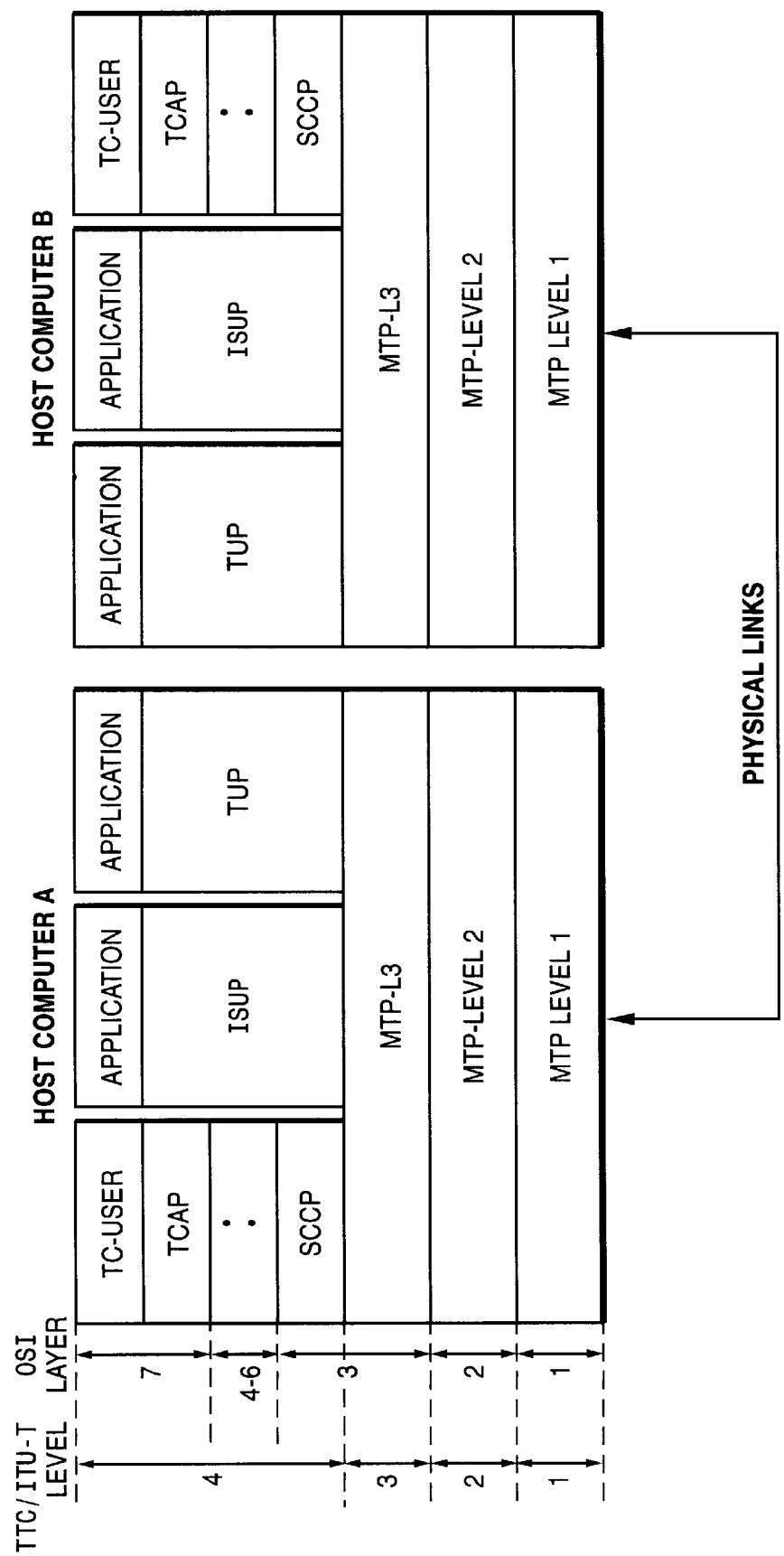
FIG. 1 is a diagram illustrating various levels or layers of different communication protocol models.
Figure 2:
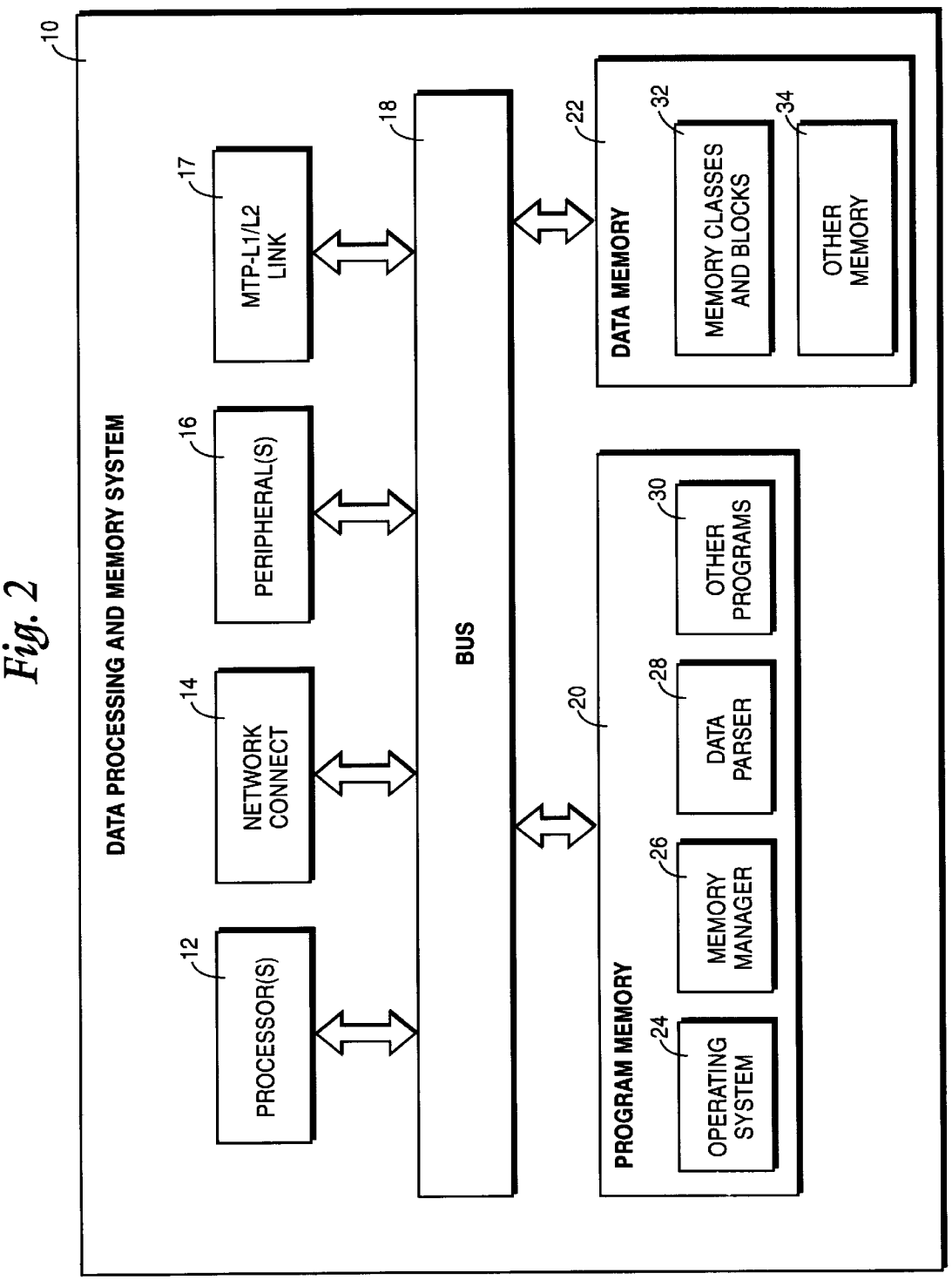
FIG. 2 shows a data processing and memory system in which the present invention may be implemented.

The present invention is first described in a general data processing and memory management environment. In particular, FIG. 2 discloses a data processing and memory system 10 which may be embodied for example in a workstation in which one example implementation of the present invention may be practiced. The data processing and memory system 10 includes one or more data processors 12 for processing data in accordance with a particular bit size configuration, e.g., a 32- or 64-bit processor. The data processor(s) 12 are connected via appropriately sized access bus(es) to a communications bus 18 which is also configured to a certain bit size, e.g., a 32-bit wide or 64-bit wide bus. Also connected to the communications bus 18 is a generic network connect block 14, e.g., an Ethernet connection, representing the input and output to a communications network such as the Internet and various peripheral devices 16. An MTP-L1/L2 link card 17 is shown and is employed in an example SS7 application of the invention described later.

The data processing and memory system 10 includes program memory 20 and data memory 22 connected via corresponding memory access buses to the communications bus 18. Memory includes random access (RAM) or other volatile storage device along with read only memory (ROM) and/or other static storage for storing stack information and instructions. The program memory 20 includes various software programs and processes such as an operating system 24, a memory manager 26, a data parser 28, and other programs 30 including for example SS7 stack processes. The main data memory 22 is dynamically allocated to various processes and tasks and includes (1) memory classes or groups and (2) memory blocks 32 configured in accordance with the present invention as well as other memory 34.

In general, the main data memory 22 is typically large, e.g., 128 megabytes or more. When the data processing and memory system 10 is booted-up and the operating system and other application software are loaded, the memory manager 26 determines from the operating system how much of the main memory 22 is available for dynamic allocation. The memory manager 26 requests a large area of fixed, non-swappable, available memory and receives a pointer or starting memory address from the operating system 24. Thereafter, the operating system 24 views that allocated, large area of memory as fixed and it is selectively dynamically allocated by the memory manager 26 to various requesting processes by passing respective pointers to those processes.

The memory manager 26 divides the fixed memory area into an integral number of class memory blocks each of which is zeroed and linked together with other memory blocks in its class. The memory blocks in each class have the same size, and memory block sizes differ between each class. Assume for example that operating system 24 returns 64 kilobytes of fixed memory to the memory manager 26. The memory manager 26 divides that fixed block into a certain number of memory blocks for a certain number of memory classes. FIG. 3 for example shows memory classes of increasing block size where class 1 memory blocks each have 16 octets, class 2 memory blocks each have 32 octets, class 3 memory blocks each have 64 octets, class 4 memory blocks each have 128 octets, and so forth. The memory manager 26, for example, may divide the 64 kilobytes up into 128 class 4 memory blocks, 256 class 3 memory blocks, 512 class 2 memory blocks, and 1,024 class 1 memory blocks.

FIG. 4 illustrates the number of octets in the memory block contained in each class for the configuration in FIG. 3. These particular values are selected to accommodate practical CPU and data bus bit widths which typically correspond to 16 bits, 32 bits, 64 bits, 128 bits, etc. In this way, the class memory block sizes can be efficiently processed by the CPU and transmitted over the bus in "alignment" with the CPU and bus width. If the bus sizes were 16, 32, 64, or 128 bits wide, a class 1 block of 16 octets requires 8, 4, 2, and 1 bus cycles, respectively, to be fetched by the CPU. Moreover, each memory block is preferably aligned by beginning at addresses which are CPU/bus bit-width multiples. This allows the CPU to fetch data blocks from memory using a minimum number of CPU cycles and to efficiently use the entire width of the data bus. The operating system divides up memory in a way which can be efficiently handled by the instruction set provided in the CPU in use in a specific computer. The memory is divided into bus-width segments numbered 0 (zero) for the first, 1 (one) for the next, etc. Hence, the entire available memory is defined in bus-width units, each assigned a numerical address consisting of the index number of that unit. Then when the CPU desires to fetch data from memory, a request is sent to memory containing the bus-width unit number with another number indicating the number of units desired. These memory units are then sent to the CPU and kept in a cache memory where the fetched information is saved while being used. This reduces the number of bus access cycles which is advantageous because bus access times are much slower than cache access times.

Of course, the memory class sizes configured for a particular system should be adapted to the needs of a particular application. For example, in some SS7 systems such as those used for "streaming" data, i.e., transmitting or receiving large bit streams for transporting music or video, longer message formats are received from an application and broken up for transmission into normal message links. Upon reception, they are reassembled before being given to the application. For such an application, the class sizes employed in FIG. 5, i.e., 64, 128, and 256, may be used to accommodate such messages with high efficiency. If the present invention is applied to an ATM network, for example, the memory class block configuration should be adapted to accommodate ATM transport media formats with high efficiency.

Figures 6, 7:
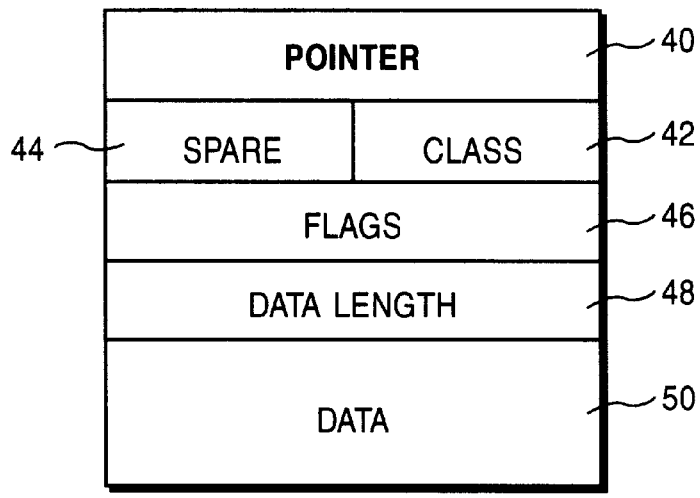
FIG. 6 illustrates an example configuration of an individual memory block.
FIG. 7 illustrates a free/available memory class index list.

FIG. 6 illustrates an example format for a memory block in accordance with the present invention. Each memory block includes a pointer field 40, a class field 42, a spare field 44, a flags field 46, a data length field 48, and a data field 50. In a preferred embodiment, pointer field 40 includes a four octet pointer and is used to consecutively link each memory block in a class. The class field 42 identifies the memory class to which the memory block belongs. The flags field 46 includes a flag indicating special kinds or properties of messages, such as alarms, message priorities, or the like, and the data length field 48 indicates the number of octets in the actual data stored in the data field 50.

The memory manager 26 (FIG. 2) indexes each class into a two pointer array for classes 1–4. FIG. 7 shows such as index list for memory. There is a first pointer 1 pointing to the first memory octet in the class, and a second pointer 2 pointing to the first available memory block in that class. The first pointer 1 never changes, and the second pointer 2 changes as memory blocks are allocated and returned. Initially, the two pointers 1 and 2 are the same address.

Once these various data structures have been established by the memory manager 26, application processes (such as the SS7 stack processes) are begun. When a process requires a class 1 block, it calls a function in the memory manager 26 designating class 1 and receives a pointer to a first available class 1 memory block. When the function returns the pointer, the process then fills in the data field, inserts the data length in the data-length field, and adjusts any other field values as required. If the memory block is used to report an alarm, the pointer may immediately be sent to a system management process for appropriate action. If the memory block is a part of a message, it may be linked to other blocks in a list, (i.e., string of linked blocks), before the pointer to the first block in the message string is given to the next process. The memory manager 26 moves the class 1 available memory block pointer to the next memory block in that class. When a process wishes to return a memory block, it calls a return function in the memory manager 26 with that memory block pointer as a parameter. The memory manager 26 then links the returned memory block pointer to the available list for that class. In this way, the memory manager 26 keeps track of which memory blocks in each class are available and which are currently being used.

Figure 8:
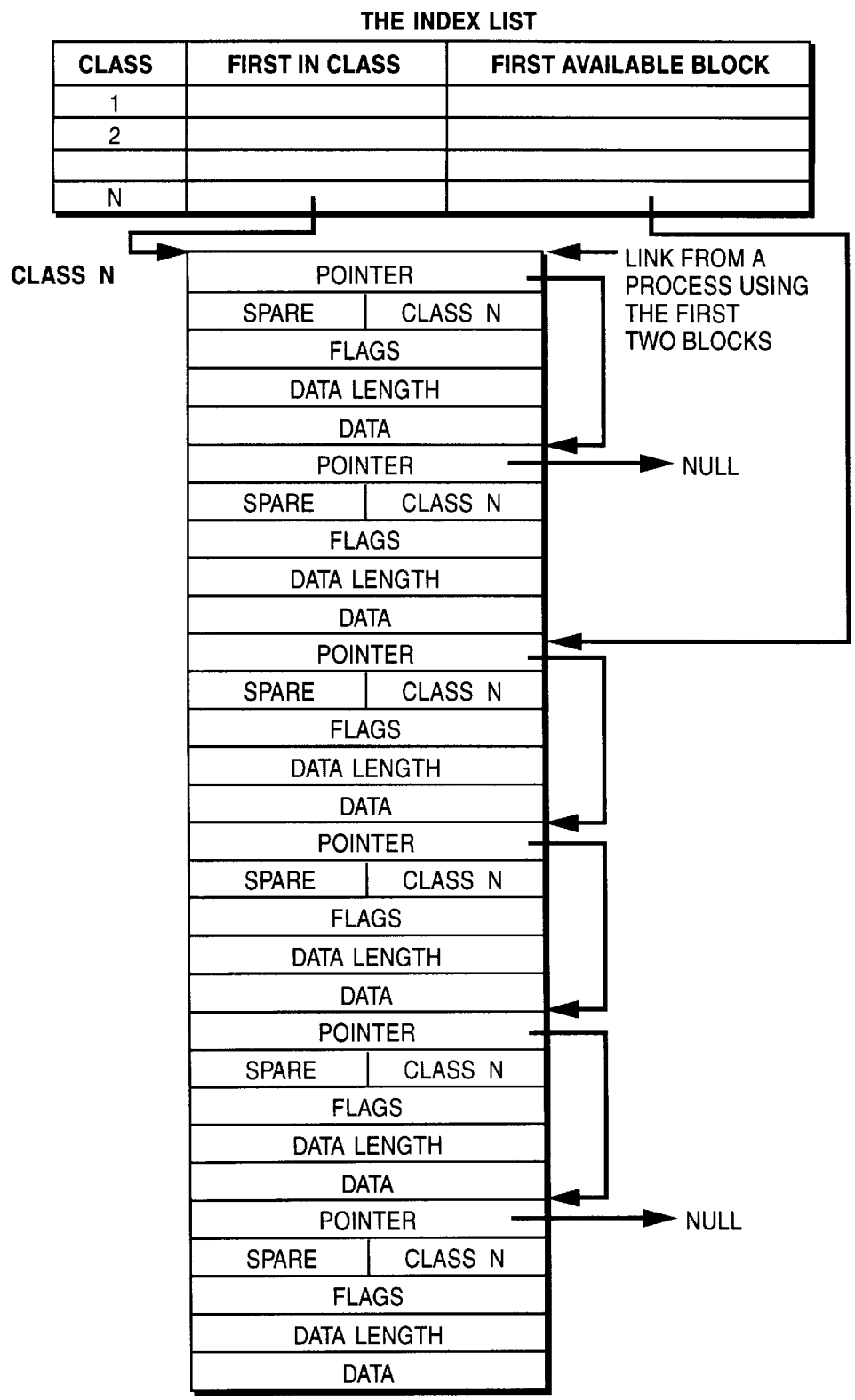
FIG. 8 illustrates pointer links between the index list and memory blocks in a particular memory class.

FIG. 8 shows how memory blocks in a class N are linked together and to the index list. The first octet pointer for class N points to the first octet of the first class N memory block as shown. The first two memory blocks are used to store a logical block of data like a message. Accordingly, the first memory block's pointer points to the next memory block being used to store a message. Since it is a relatively short message and only two memory blocks are used, the pointer in the second memory block points to "null" to indicate that there are no additional memory blocks storing this message. Because the third memory block is the first available memory block in class N, the first available block pointer for class N points to the starting address of the third memory block. Each of the following available memory blocks (fourth, fifth, sixth, etc.) is linked to the next consecutive available memory block in class N via its pointer field. The last available memory block in class N points to null.

The length field in each available memory block is set to null so that when the memory manager 26 reviews the index list, it can determine the number of unused memory blocks available for allocation. In addition, the memory manager 26 may count the number of null length fields and compare the two numbers. If they do not match, it is possible to trace the "lost" memory blocks and read their contents and the contents of any other memory blocks linked after it. This is particularly useful in debugging and solving the bug as compared to traditional methods requiring an entire dump of memory coupled with tedious examination of hexadecimal fields.

When analyzing incoming messages, the data parser 28 (FIG. 2) detects the type of message, breaks it up into segments if necessary or otherwise desirable, e.g., separates the header from the data, and stores the message or message segments in a memory block from a class having a size that can efficiently accommodate the parsed message or message segment. A message is effectively sent to the next process by giving the pointer value to the next process, thereby permitting that process to gain access to the data area in memory. If a message is stored in several blocks, those memory blocks are linked by their respective pointers with the last memory block pointer set to null.

Figure 9:
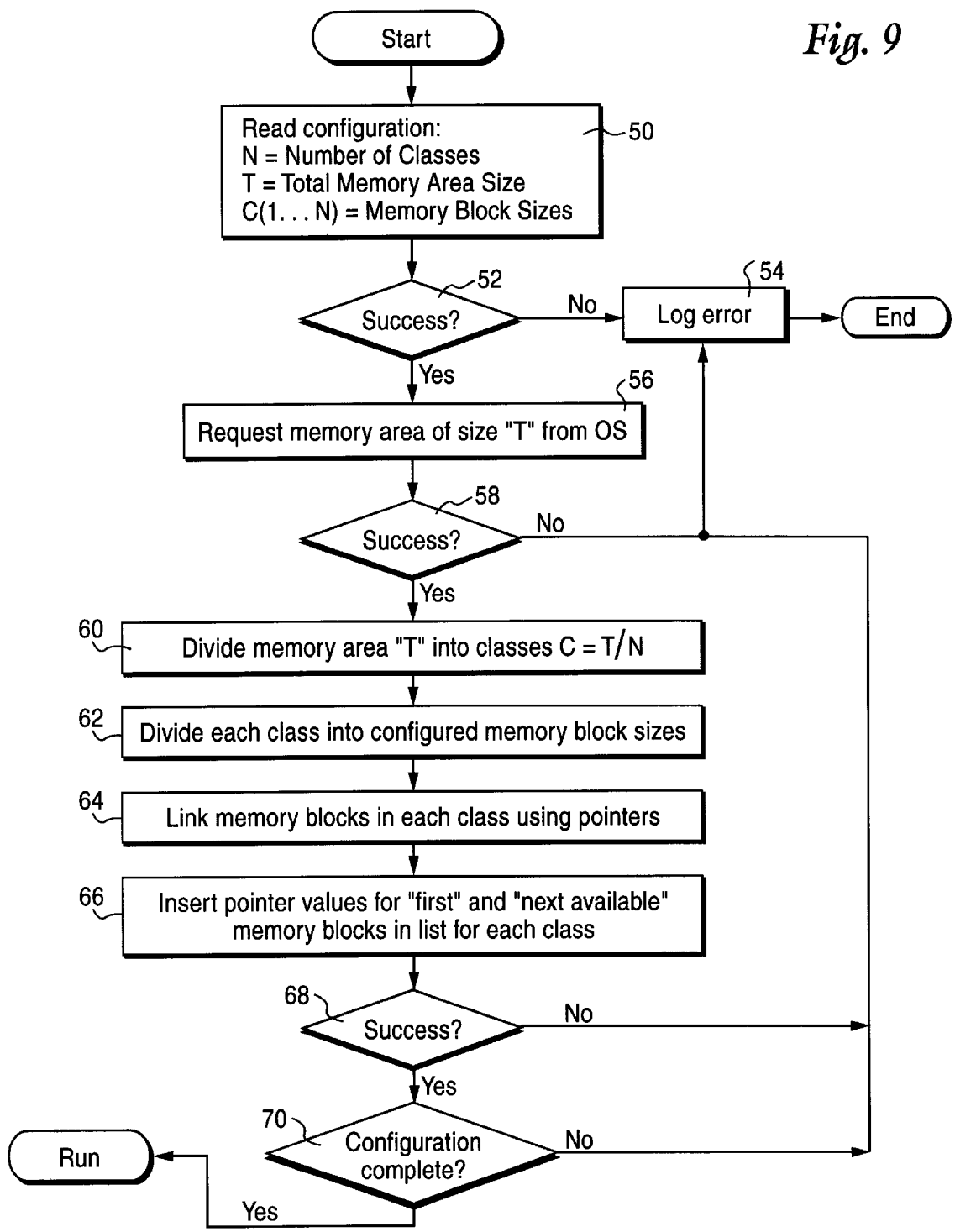
FIG. 9 is a flowchart diagram illustrating how memory is allocated by the memory manager in accordance with an example embodiment of the present invention.

FIG. 9 is a flowchart illustrating example procedures for configuring memory in accordance with the present invention. Initial memory configuration data set by an operator are read (block 50). The configuration data include a number of memory block classes N, a total memory area size T, and various memory block sizes C(1 . . . N). The number of classes N and memory block sizes C are selected to efficiently use available memory in accordance with the types and sizes of messages expected to be handled as well as to ensure alignment with the bit widths of the CPU(s) and communication bus. A determination of an unsuccessful configuration process (block 52) results in a logged error (block 54). Otherwise, the memory manager 26 requests a memory area of size "T" from the operating system (block 56). If this request is unsuccessful (block 58), then error is logged (block 54). Otherwise, the memory area T is divided by the memory manager into classes C in accordance with an algorithm which provides an efficient distribution of block classes and blocks within each class to efficiently provide for the needs of the specific application. This may be done by statistically examining the data flow and configuring the classes thereafter (block 60).

The memory manager 26 divides each class area into its configured, corresponding memory block sizes (block 62). The memory blocks in each class are consecutively linked using pointer values stored in the pointer fields of each memory block (block 64). In addition, the index list is generated by the memory manager and includes two pointer values for each class including a first memory block in the class pointer value and a next available memory block in the class pointer value (block 66). A determination is made (block 68) whether the operations performed in blocks 60–66 were successful. If not, an error is logged; otherwise, a decision is made whether the memory configuration is complete (block 70). An incomplete configuration results in a logged error. Once the configuration of memory is complete, the processes are ready to run.

Figure 10:
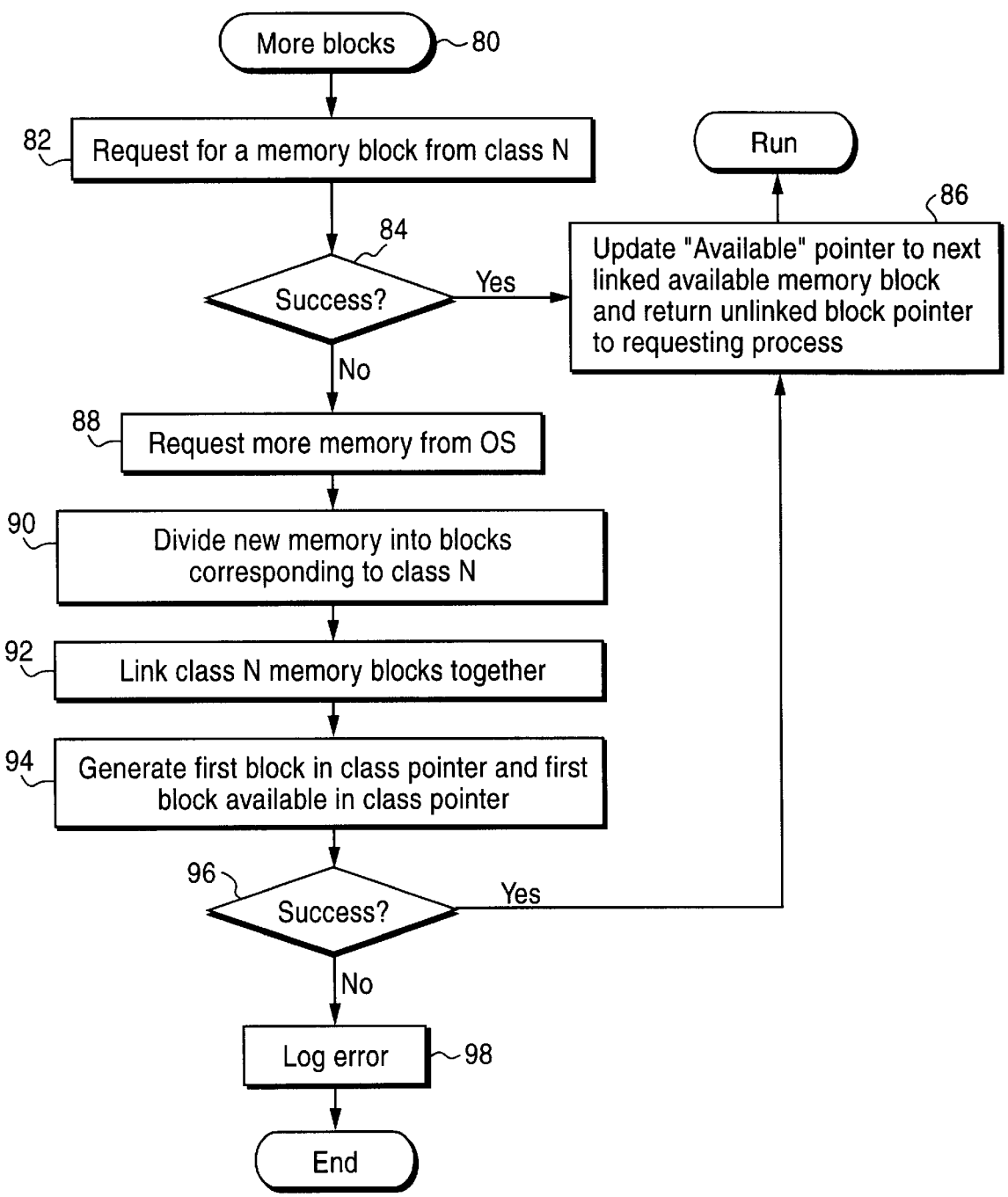
FIG. 10 is a flowchart outlining procedures for obtaining more memory blocks.

In some instances, there may be no available memory blocks of a particular size. Using the More Blocks routine (block 80) shown in FIG. 10, memory blocks are added as necessary. A request for a memory block from a particular class N is received at the memory manager (block 82). A decision is made whether there is an available memory block from class N that can be allocated in response to that request (block 84). If so, the first available memory block pointer is updated to point to the next linked available memory block in class N, and the unlinked block pointer for the available memory block is provided to the requesting process for use (block 86).

An unsuccessful decision means there are no available memory blocks from class N. As a result, the memory manager 26 requests more memory from the operating system in order to create more memory blocks for class N (block 88). The memory provided by the operating system is divided by the memory manager into blocks corresponding to class N size (block 90). The newly created class N memory blocks are linked together via pointer(s) (block 92). The index list is also updated, and in particular, the first available block pointer points to the first memory block of the newly-created blocks (block 94). A decision is made (block 96) whether the operations in blocks 88–94 were successful. If not, an error is logged (block 98). Otherwise, control returns to block 86.

Figure 11:
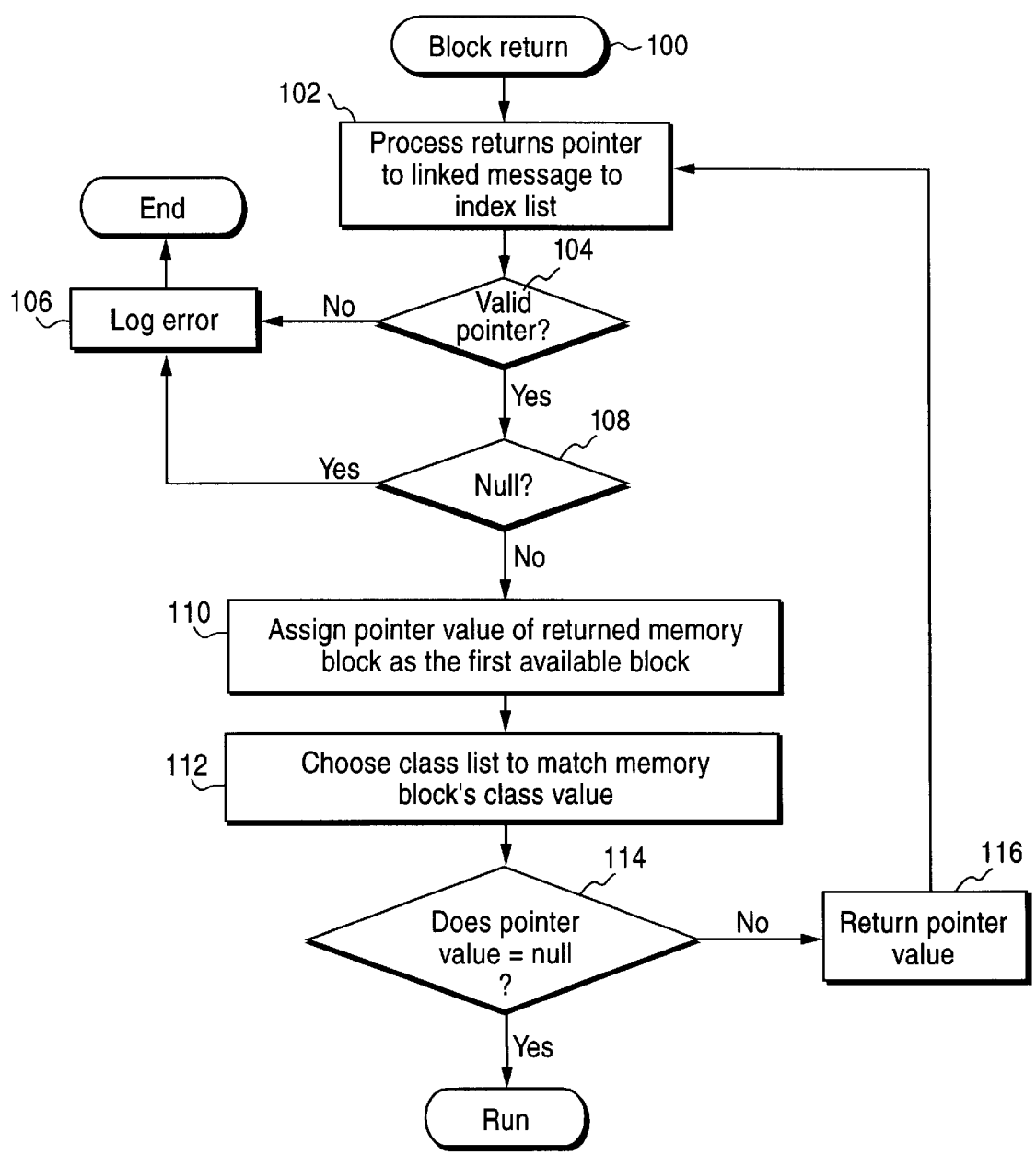
FIG. 11 is a flowchart outlining procedures for returning memory blocks.

After a process finishes using a memory block, that memory block is "returned" in the sense that its pointer is returned to the index list, and indicated as being available. FIG. 11 is a flowchart showing a Block Return routine (block 100). A process returns the message block pointer for the returned message block to the memory manager's index list (block 102). A decision is made whether the returned pointer is valid (block 104). If not, an error is logged (block 106); otherwise, a decision is made whether the value of the pointer is null (block 108). If so, an error is logged; otherwise, the memory manager makes the pointer value of the returned memory block the first available memory block for its corresponding class in the class list (block 110). More specifically, the memory manager 26 reads the class value for the returned memory block from its class field (block 112), and chooses the class list matching that class value. A decision is made (block 114) whether the pointer value corresponds to null. If not, the pointer value is returned to block 116.

Once data is written into memory, it remains unchanged until erased, overwritten or destroyed, e.g., by a power loss or some other fault. Thus, by writing data into memory and then giving access to that memory by providing the pointer value to another process, the data is effectively moved without actually being physically moved. By linking blocks containing data to one another, the invention advantageously permits the addition of data in front of other data without copying, even though data is written sequentially into one memory address and the following memory areas. This advantage is significant because it is difficult to know exactly how much memory needs to be reserved for additional data at a later process. In addition, the later process cannot know where the message begins relative to the start of the memory area without searching the memory area. This is the reason for message copying in the prior art. More specifically, because of memory cost, messages in the prior art are kept tightly packed, headers are added by writing the header into a new memory area, the remainder of the message is copied from the old area to the new area, and thereafter, the old memory area is returned to the OS.

Figure 12A:
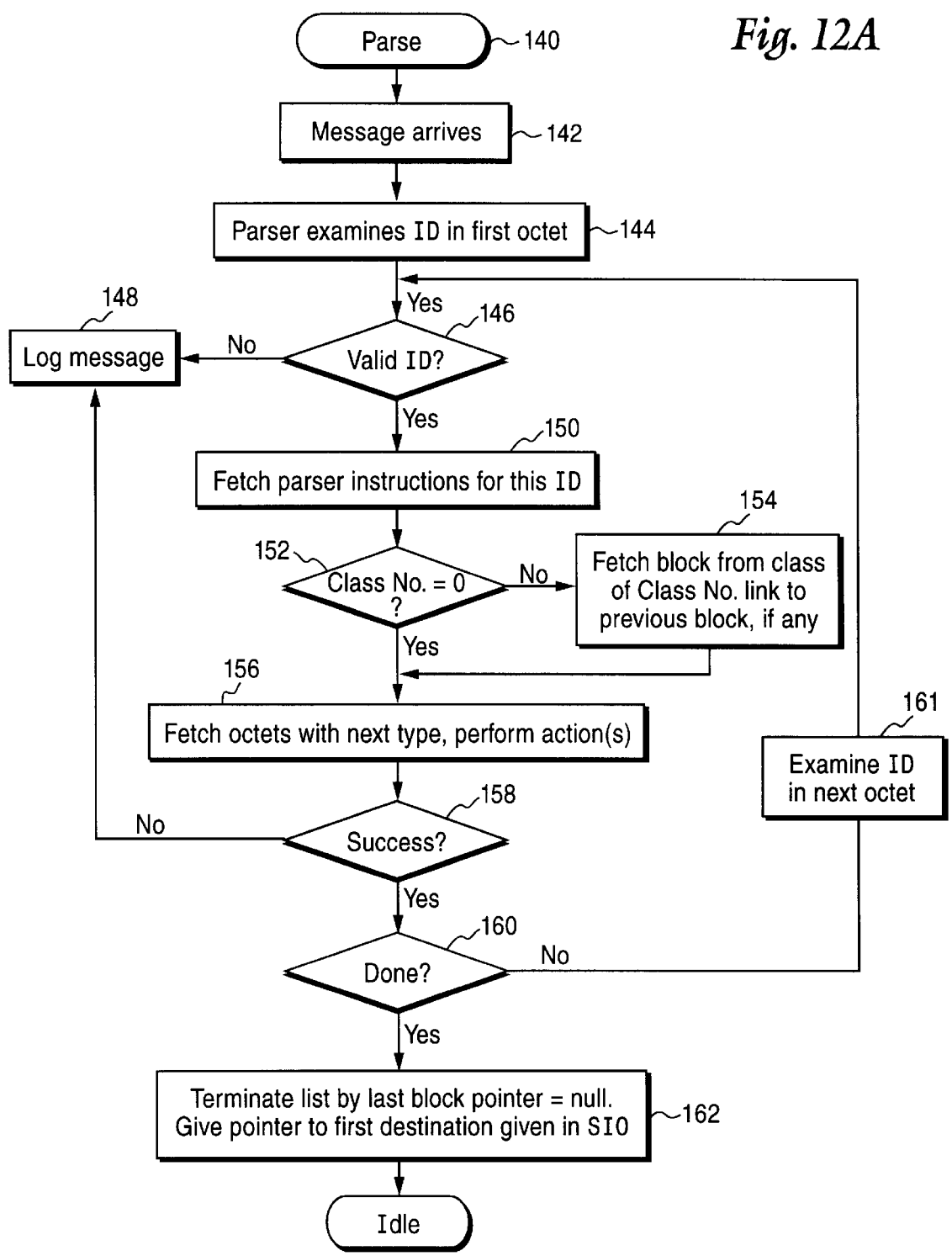
FIG. 12A is a message parsing flowchart.

An overview of the example procedures that may be performed by the data parser 28 are now described in conjunction with the flowchart in FIG. 12A and table in FIG. 12B. In general, the Parse routine (block 140) divides received messages into messages and message segments for storage in appropriate sized, available memory blocks. (The term message is used generally here to include any logical units of data.) A message arrives in block 142 for parsing. The parser 28 examines the ID field in the first octet of the message (block 144). A decision is made (block 146) whether that ID is valid. If not, an error message is logged (block 148). If the ID is valid, the parser 28 fetches parser instructions corresponding to this valid ID which identify the type of message (block 150). The table in FIG. 12B is an example of parser instructions for different types of messages used in Signaling System Number 7.

A decision is made (block 152) whether the class number corresponding to the message type is zero. If not, an available memory block is fetched from the class corresponding to the fetched parser instructions for that type of message. As shown in the table in FIG. 12B, each parser instruction indicates a particular class number. In addition, the parser links the fetched memory block to any previous block via the previous block's pointer. If the class number corresponds to zero, the parser fetches octets with the next type as indicated by the parser instructions and performs the action(s) indicated in that parser instruction (block 156). The parser analyzes and recognizes information in the specific fields of each message and performs a suitable action depending on that information. Another suitable parsing action is then performed depending on what has already been parsed, what the next field indicates, and what alternatives are permitted by the parsing program used in the implementation. A decision is made whether the previous events were successful (block 158). If not, an error message is logged (block 148); otherwise, a decision is made in block 160 whether the message has been parsed. If not, the parser continues to parse the message with control returning to block 146. More specifically, the parser examines the ID of the next octet in the message and repeats the procedure described beginning at block 146. If the message is completely parsed, the parser terminates the index list by setting the last memory block pointer in which the parsed message is stored to null (block 162). The pointer is then given to the next process using the inter-process communication facilities in the operating system. Similar operations are performed by the Parse routine for a next received message.

Figure 13:
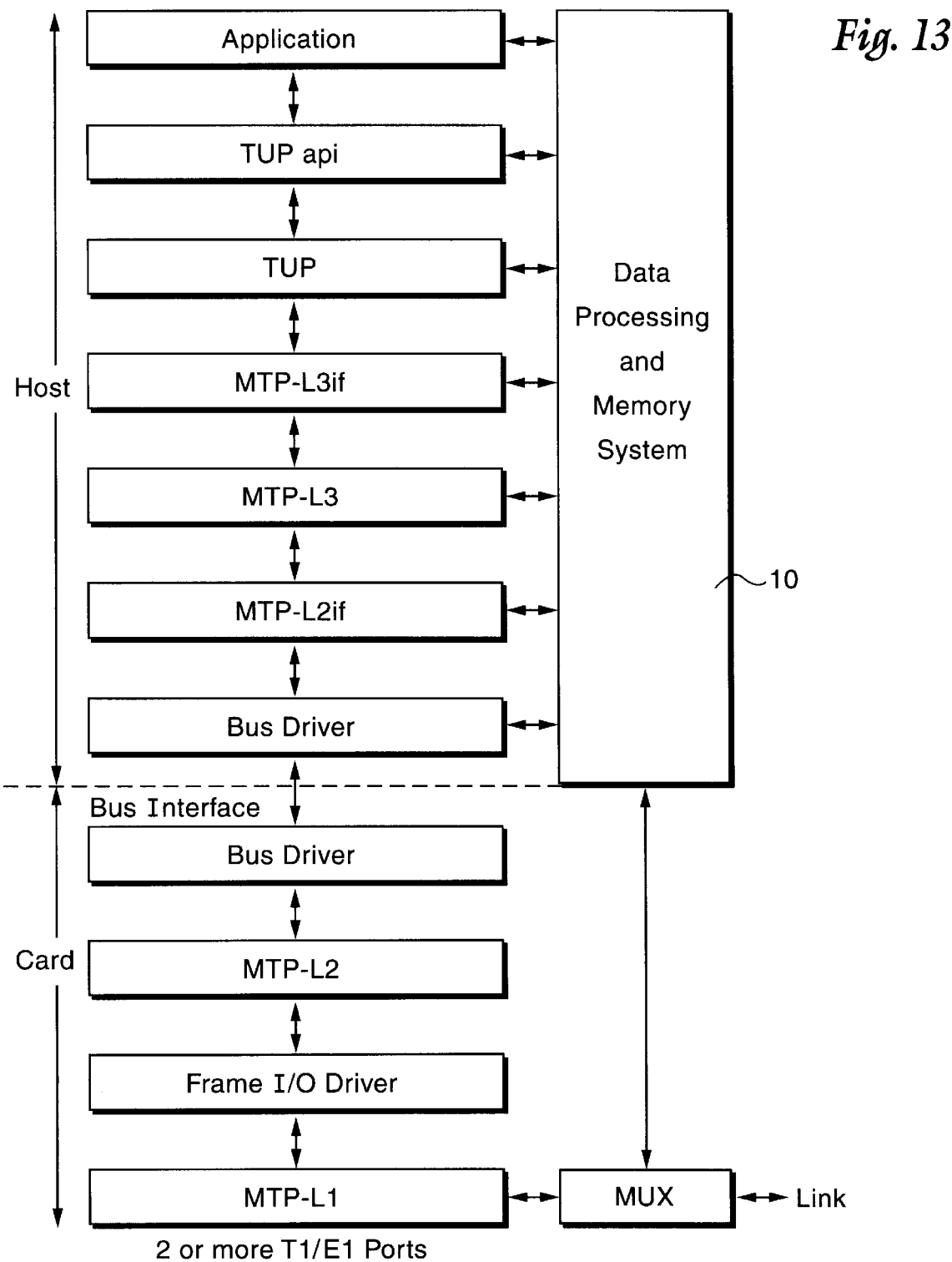
FIG. 13 illustrates application of the data processing and management system to an SS7 protocol stack.

A more specific, (but still example), embodiment of the present invention as applied to a Signaling System Number 7 (SS7) application is now described. FIG. 13 shows the data processing and memory management system 10 applied to certain layers of an SS7 stack. As shown, MTP-L1 and MTP-L2 including the frame input/output (I/O) driver between the layers L1 and L2 and a bus driver for interfacing with the upper layers are implemented in the form of a hardware "card" which uses a special embedded operating system. Accordingly, the data processing and memory system 10 controls what is characterized as the "Host" including the bus driver, MTP-L2if (i.e., if=interface), MTP-L3, MTP-L3if, TUP, TUP application programming interface (api), and Application layers of the SS7 stack. Thus, the SS7 stack for purposes of the immediately following description includes only these "Host" layers. Those skilled in the art appreciate of course that the present invention could be applied to any number of layers in any communications protocol stack.

For an incoming message from the MTP-L2 card to the Host, the parser 28 (FIG. 2) parses the message following procedures similar to those described above. For example, the message header may be placed into a class 1 memory block, and the data portion of the message may be placed into another class 1 memory block linked to the first memory block via the first block's pointer. The parser 28 then sets the length in both memory blocks to correspond to the length fields of the header and the data portion, respectively. The second block's pointer is set to null to indicate the end of the message.

Figure 14:
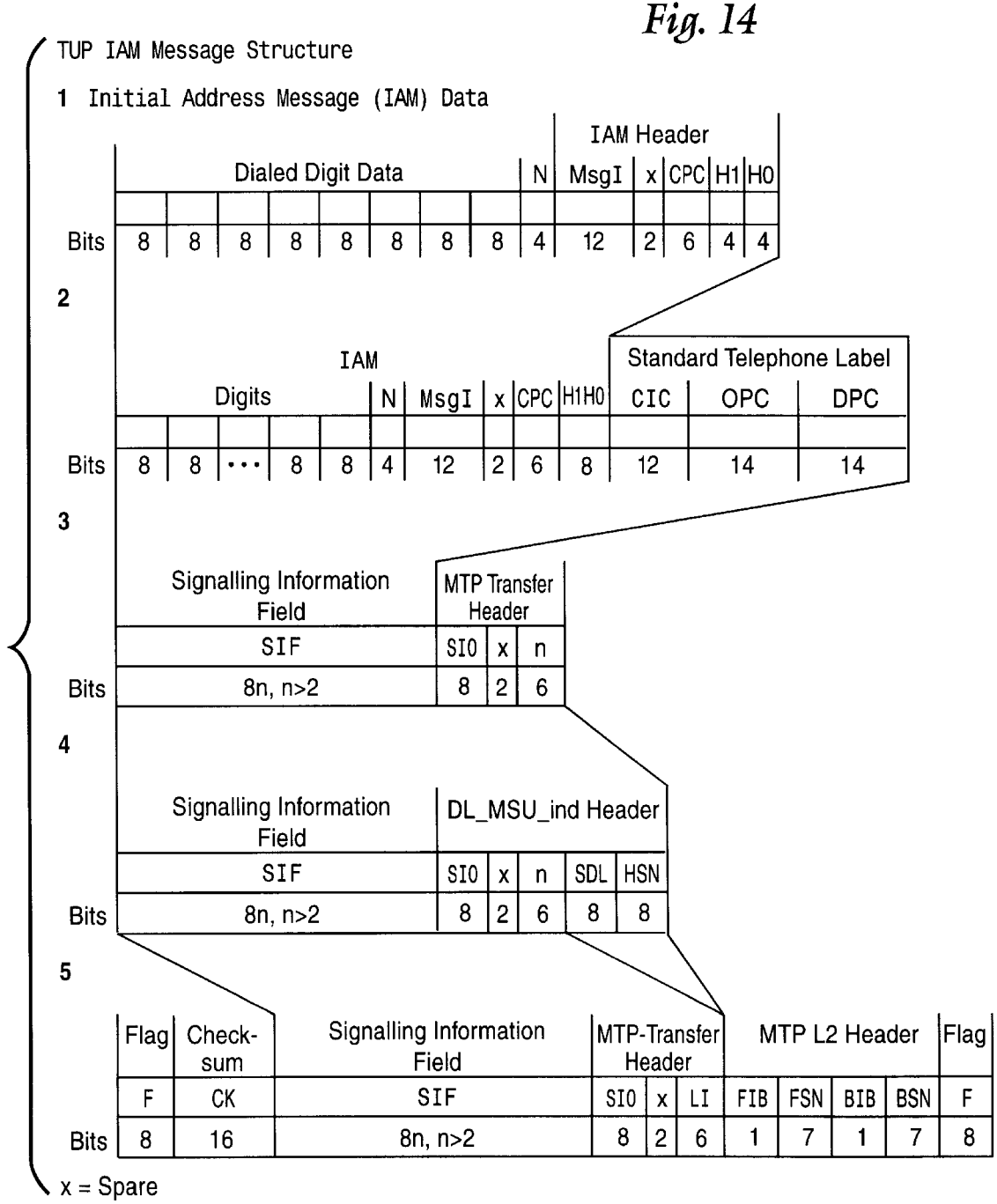
FIG. 14 illustrates the format of an example Initial Address Message (IAM) message processed (in part) in accordance with the present invention.

To give a detailed, practical example of a real world message, FIG. 14 illustrates the structure of a telephony user part (TUP) Initial Address Message (IAM), to be processed through the SS7 stack. The IAM is an MSU (message signal unit), and Table 1 below defines various MSU fields in SS7.

TABLE 1

| | F | CK | SIF | SIO | P | LI | FIB | FSN | BIB | BSN | F |
|---|---|---|---|---|---|---|---|---|---|---|---|
| Bits | 8 | 16 | 8n, n > 2 | 8 | 2 | 6 | 1 | 7 | 1 | 7 | 8 |

| Data: | Content: | Length: |
|---|---|---|
| F | Flag octet at frame start or end (7EH) | 8 bits |
| BSN | Backward Sequence Number | 7 bits |
| BIB | Backward Indicator Bit | 1 bit |
| FSN | Forward Sequence Number | 7 bits |
| FIB | Forward Indicator Bit | 1 bit |
| LI | Length Indicator n | 6 bits |
| SIO | Service Information Octet (SI + SSF) | 8 bits |
| SSF | Sub Status Field | 4 bits |
| STI | Status Indicator | 3 bits |
| NI | Network Indicator n | 2 bits (Bits DC of SSF of SIO) |
| P | Priority Indicator (MSU only) | 2 bits (Bits BA of SSF of SIO) |
| SF | Status Field (3 low bits are STI) | 8 bits (High bits of SIO) |
| SI | Service Indicator | 4 bits |
| x | Spare, not used | 2 bits |
| CK | Checksum | 16 bits |
| F | Flag octet at frame start and end (7Eh) | 8 bits |

In general, the Initial Address Message (IAM) in the TUP collects the dialed digits of a phone call, packs them into an IAM data field, and forwards that data to the MTP-L3 process. The MTP-L3 process adds routing information, i.e., where to send the digits, and provides the message to the MTP-L2 process for transmission.

In more detail, the format in line 1 of FIG. 14 shows the upper end of the TUP IAM data with the dialed digit data and an IAM header. Line 2 shows the lower end of that same TUP message which adds a Standard Telephone Label (STL) using standard fields CIC, OPC, and DPC. The Destination Point Code (DPC) is the node address to which the message is sent; the Originating Point Code (OPC) is the node address from which the message was sent; and the Circuit Identification Code (CIC) uniquely identifies the particular speech circuit within the identified traffic route to which the signaling information contained in the message relates.

Modern telephone systems send conversation in digital codes and the CIC identifies a particular "time slot" in a stream of bits sent over the signaling medium. The CIC is the ID number of a particular time slot on a particular link. Line 3 of FIG. 14 shows the addition of the MTP transfer header added at MTP-L3 with the total TUP message embedded in the Signaling Information Field (SIF). The MTP transfer header includes an SIO field, an X spare bits field, an n field, and ID field. At line 4, an additional DL_MSU_ind header is added by the MTP-L2if process including fields SDL and HSN. Line 5 shows the addition of flag and checksum bits as well as an MTP-L2 header including FIB, FSN, BIB, and BSN fields, which occurs at the moment the MTP-L2 delivers the transmit buffer contents to hardware which computes the checksum and performs other operations while sending the bits over the telelinks to the next node.

The processing of the TUP IAM message shown in FIG. 14 down the SS7 stack shown in FIG. 13 is now described. Since the Initial Address Message (IAM) corresponds to a telephone user dialing a telephone number, the TUP initially determines when the user telephone is off-hook and digits have been dialed. The TUP process then provides the dialed digit data, and the memory manager 26 requests a memory block to store those digits.

The number of digits (called "Address Signals") are counted as they are received. When the expected address signals are received without error and validated, the TUP process inserts the number of address signals and the address signals themselves, a Calling Party Category code (which identifies whether it is a subscriber, operator, or test), the default language, other information, and finally a heading code, "00010001," which identifies this message as an IAM. The TUP process knows precisely where each octet is to be placed once the number of address signals is known. In the block header, the total IAM length is inserted, the priority flags, if any, are set in the flags field, and the pointer field is set to NULL. The TUP then sends the pointer to the IAM message (but not the IAM message itself) to the MTP-Level 3 process.

The MTP-L3 determines where the message is to be sent by identifying the message as an IAM, (i.e., by looking at the heading code), fetching the address signal, and determining therefrom where the signal should be sent using area codes, etc. The MTP-L3 then requests a block of a suitable memory class from the memory manager, links the memory block to the IAM, writes the Standard Telephone Label, consisting of the DPC, OPC, and CIC codes from a database for that address signal, and updates the appropriate fields of the class block header. MTP-L3 then sends the pointer to another process, where a third class memory block is requested, linked to the previous memory block, and then the following information is inserted: the Hardware Selection Number (HSN) and Signaling Data Link (SDL). HSN and SDL define the specific MPT-Level 2 and telelink to be used for transmitting the IAM to the next node, followed by the length of the information in the following linked blocks plus a Signaling Information Octet (SIO) which follows the length. After updating the class block header, the MTP-L3 process gives the pointer to the MTP-L2 process designated by the HSN code.

Continuing down the stack, the MTP-L2 process reads the DL_MSU_ind header which is only used between the MTP-L3 and MTP-L2 processes. Since the DL_MSU header is not transmitted, the MTP-L2 reads and verifies the HSN and SDL to determine which link is to be used. MTP-L2 then discards the DL_MSU header while assembling the remaining data from the following class blocks in the SDL's transmit buffer for transmission on the indicated telelink to the next node. MTP-L2 then gives the pointer to the memory manager as a function parameter, where the function then frees the memory as described above with respect to FIG. 11. The transmit buffer contains the fields LI to SIF in Table 1. When the link can accept the data, the MSU is completed with the remaining fields (BSN, BIB, FSN, FIB). The CRC is computed and added as the CK (checksum), the bits are adjusted using a "bit stuffing" process, and the data is transmitted on the telelink.

The foregoing description shows only example embodiments of the present invention. Various modifications and will be apparent to those skilled in the art without departing from the scope of the present invention defined only by the appended claims. Therefore, the embodiments shown and described are only illustrative, not restrictive.

What is claimed is:

1. A method for allocating memory, comprising the steps of:

a memory manager requesting an area of memory from an operating system;

the memory manager dividing the memory allocated by the operating system in response to the requesting step into plural classes with each class having memory blocks of a particular size and each of the memory blocks in each class being linked together by respective pointers, where the size of the memory blocks for each of the classes is different, and wherein each of the memory blocks has a starting addresses that is a multiple of a bit width of a bus in communication with the memory;

analyzing a data message to be stored in the memory to determine the size of the message or a portion of the message; and storing the message or portion of the message in an available one of the memory blocks from a group corresponding to the determined size of the message or portion of the message.

2. The method in claim 1, wherein the memory blocks in each class include a number of octets corresponding to a number of octets found in the message or portion of the message.

3. The method in claim 2, wherein there are four classes with a first class having memory blocks with 64 octets, a second class having memory blocks with 128 octets, a third class with memory blocks having 256 octets, and a fourth class with memory blocks having 512 octets.

4. The method in claim 2, wherein there are four classes with a first class having memory blocks with 16 octets, a second class having memory blocks with 32 octets, a third class with memory blocks having 64 octets, and a fourth class with memory blocks having 128 octets.

5. The method in claim 1, wherein the memory block sizes are based on a bit width of data processing circuitry used in processing the message.

6. The method in claim 1, wherein the memory block sizes are based on a bit width of a bus used to access the memory.

7. The method in claim 5, wherein the memory blocks have starting addresses that are integral multiples of the data processing circuitry bit width.

8. The method in claim 1, wherein the message varies in length with a predetermined header being added and a first one of the classes includes memory blocks sized to accommodate the predetermined header.

9. The method in claim 8, wherein the message includes a message signaling unit (MSU), the predetermined header is either appended to or removed from the MSU, and a second one of the classes includes memory blocks selected to accommodate a length of the MSU.

10. The method in claim 9, further comprising:
linking the header stored in a memory block from the first class to the MSU stored in a memory block from the second class in a chain.

11. The method in claim 1, further comprising:
maintaining for each class a linked list of the available memory blocks in that class.

12. The method in claim 11, further comprising:
initializing available memory blocks, and
reinitializing previously unavailable memory blocks that become available.

13. The method in claim 11, further comprising:
indicating when a memory block is allocated for use by a process.

14. The method in claim 11, further comprising:
linking memory blocks from the same class together including establishing a first pointer for each class pointing to the first memory block in that class and a second pointer pointing to the first available memory block in that class.

15. A memory system comprising:
a memory;
a memory manager requesting an area of memory and thereafter dividing memory designated by an operating system in response to the request into groups with each group having memory blocks of the same size, where the size of each group's memory blocks is different and is set to accommodate a size of data units to be stored in the memory, and memory blocks in each group initially being linked together by respective pointers;
wherein one or more data units are selectively stored in one or more of the memory blocks sized to efficiently accommodate the sizes of the one or more data units; and
wherein the memory manager links unused memory blocks in one of the memory groups together in a list of available memory blocks for the one memory group, and removes a memory block from the list when that memory block is requested for use and returns that memory block to the list when that memory block is no longer needed.

16. The memory system in claim 15, wherein the memory manager delivers a pointer to a process to provide the process access to one of the memory blocks.

17. The memory system in claim 15, wherein there are four groups with a first group having memory blocks with 16 octets, a second group having memory blocks with 32 octets, a third group having memory blocks with 64 octets, and a fourth group with memory blocks having 128 octets.

18. The memory system in claim 15, wherein there are four groups with a first group having memory blocks with 64 bytes, a second group having memory blocks with 128 bytes, a third group having memory blocks with 256 bytes, and a fourth group having memory blocks with 512 bytes.

19. The memory system in claim 15, further comprising:
a parser that analyzes the size of data units to be stored in the memory and divides the data units and stores the data units in memory blocks closest in size to accommodate the data units.

20. The memory system in claim 15, wherein the size of each group's memory blocks is based on a bit width of data processing circuitry used in processing the data units.

21. The memory system in claim 20, wherein the memory block sizes are integral multiples of the bit width.

22. The memory system in claim 20, wherein the memory blocks have starting memory addresses that are integral multiples of the bit width.

23. The memory system in claim 15, wherein the memory manager generates and initializes the memory blocks and links together available memory blocks in each group.

24. The memory system in claim 23, wherein the memory manager indicates in a memory block when the memory is allocated for use and when the memory block is available for use.

25. The memory system in claim 23, wherein the memory manager links memory blocks from the same group together including establishing a first pointer for each group pointing to the first memory block allocated in the group and a second pointer pointing to the first available memory block in the group.

26. A data processing system comprising:
a memory connected to a data processor by way of a bus carrying data having a bit width;
a memory manager dividing the memory into classes with each class having memory blocks of the same size, where the size of each memory block between each class is different and based on the bit width of the bus and wherein each of the memory blocks has a starting address that is a multiple of the bit width of said bus; and
wherein data to be stored in the memory is stored in one or more of the memory blocks.

27. The data processing system in claim 26, wherein the memory blocks are fixed and cannot be swapped.

28. The data processing system of claim 26, wherein the size of the memory blocks in each class is selected for efficient processing by the data processor.

29. The data processing system of claim 26, wherein each of the memory blocks has a starting address in the memory that is an integral multiple of the bus width.

30. The data processing system of claim 26, further comprising:
a parser dividing data to be stored in the memory into data units that are accommodated by one or more of the memory blocks from one or more of the memory classes.

31. The data processing system of claim 30, wherein the data units are selected by the parser to ensure that each data unit is a complete logical unit.

32. The data processing system in claim 26, wherein the memory manager initializes available memory blocks and reinitializes previously unavailable memory blocks that become available.

33. The data processing system in claim 26, wherein the memory manager initially indicate s the first memory block in each class with a fixed pointer value.

34. The data processing system in claim 26, wherein each available memory block is linked to a next, available memory block in the same class and a first available memory block in the same class is indicated by a pointer.

35. The data processing system in claim 26, wherein the data to be stored in the memory includes a message to be processed by a first process and memory blocks used to store the message are linked together by at least one pointer.

36. The data processing system in claim 35, wherein the message is passed to a second process by passing the pointer that points to a first memory block used to store the message.

37. The data processing system of claim 26, wherein the size of the memory blocks in each class is selected to align with the bit width of the bus.

38. The data processing system of claim 37, wherein the memory manager links unused memory blocks in one of the memory classes together in a list of available memory blocks for the one memory class.

39. The data processing system of claim 38, wherein the memory manager removes a memory block from the list when that memory block is requested for use and returns that memory block to the list when that memory block is no longer needed.

40. In a data communications system employing a signaling protocol for conducting data communications between computers over a network, each computer including a memory and a data processor connected by a data bus and processing messages through plural message handling layers in a protocol stack, a method comprising the steps of:

forming in each memory plural classes of memory blocks with memory blocks in each class having the same size, wherein each of the memory blocks has a starting address that is a multiple of a bit width of the data bus;

linking memory blocks in each class together and establishing a first pointer for each class pointing to the first memory block allocated in that said class and a second pointer pointing to the first available memory block in that class;

receiving a message to be processed through the message handling layers of the protocol stack;

upon receipt of the message, writing the message in one or more of linked together ones of the memory blocks; and providing the message stored in the one or more linked memory blocks to another of the layers in the protocol stack by passing a pointer to the one or more linked memory blocks to a process corresponding to the another layer.

41. The method in claim 40, wherein the memory blocks are formed for efficient handling by a data processor over a corresponding data bus.

42. The method in claim 40, wherein the bus is 32-bits wide and a header of each memory block is eight octets in length to align with the 32-bit width of the bus.

43. The method in claim 40, wherein the bus is 64-bits wide and a header of each memory block is eight octets in length to align with the 64-bit width of the bus.

44. The method in claim 40, wherein the bus is 128-bits wide and a header of each memory block is eight octets in length to align with the 128-bit width of the bus.

* * * * *